US009042398B2

(12) United States Patent
Lee (10) Patent No.: US 9,042,398 B2
(45) Date of Patent: *May 26, 2015

(54) DYNAMICALLY ADJUSTED CREDIT BASED ROUND ROBIN SCHEDULER

(75) Inventor: Jay J. Lee, San Ramon, CA (US)

(73) Assignee: Cellco Partnership, Basking Ridge, NJ (US)

( * ) Notice: Subject to any disclaimer, the term of this patent is extended or adjusted under 35 U.S.C. 154(b) by 166 days.

This patent is subject to a terminal disclaimer.

(21) Appl. No.: 13/238,996

(22) Filed: Sep. 21, 2011

(65) Prior Publication Data

US 2012/0008636 A1    Jan. 12, 2012

Related U.S. Application Data

(63) Continuation of application No. 12/005,304, filed on Dec. 27, 2007, now Pat. No. 8,045,563.

(51) Int. Cl.
*H04L 12/28* (2006.01)
*H04L 12/801* (2013.01)
*H04L 12/54* (2013.01)
*H04L 12/815* (2013.01)
*H04L 12/841* (2013.01)
*H04L 12/873* (2013.01)
*H04L 12/863* (2013.01)
*H04L 12/861* (2013.01)

(52) U.S. Cl.
CPC ............ *H04L 47/10* (2013.01); *H04L 12/5693* (2013.01); *H04L 47/225* (2013.01); *H04L 47/283* (2013.01); *H04L 47/39* (2013.01); *H04L 47/527* (2013.01); *H04L 47/6225* (2013.01); *H04L 47/623* (2013.01); *H04L 49/90* (2013.01)

(58) Field of Classification Search
None
See application file for complete search history.

(56) References Cited

U.S. PATENT DOCUMENTS

| | | | | |
|---|---|---|---|---|
| 5,231,633 | A | * | 7/1993 | Hluchyj et al. ............... 370/412 |
| 5,841,778 | A | | 11/1998 | Shaffer et al. |
| 6,047,000 | A | | 4/2000 | Tsang et al. |
| 6,353,616 | B1 | * | 3/2002 | Elwalid et al. ............... 370/412 |
| 6,363,429 | B1 | | 3/2002 | Ketcham |
| 6,430,156 | B1 | * | 8/2002 | Park et al. ..................... 370/232 |
| 6,510,135 | B1 | | 1/2003 | Almulhem et al. |
| 6,570,883 | B1 | * | 5/2003 | Wong ............................. 370/412 |
| 6,775,231 | B1 | | 8/2004 | Baker et al. |
| 6,785,232 | B1 | | 8/2004 | Kotser et al. |
| 6,856,615 | B1 | | 2/2005 | Barve |
| 6,956,818 | B1 | | 10/2005 | Thodiyil |

(Continued)

OTHER PUBLICATIONS

Kung et al., "Credit-Based Flow Control for ATM Networks: Credit Update Protocol, Adaptive Credit Allocation, and Statistical Muliplexing," 1994, ACM ACM SIGCOMM Computer Communication Review, vol. 24, Issue 4, pp. 105-106.

(Continued)

*Primary Examiner* — Gregory Sefcheck
*Assistant Examiner* — Joshua Smith (57) ABSTRACT

A credit based queue scheduler dynamically adjusts credits depending upon at least a moving average of incoming packet size to alleviate the impact of traffic burstiness and packet size variation, and increase the performance of the scheduler by lowering latency and jitter. For the case when no service differentiation is required, the credit is adjusted by computing a weighted moving average of incoming packets for the entire scheduler. For the case when differentiation is required, the credit for each queue is determined by a product of a sum of credits given to all queues and priority levels of each queue.

8 Claims, 6 Drawing Sheets

DRR scheduler with dynamically adjusted credits

(56) References Cited

U.S. PATENT DOCUMENTS

| | | |
|---|---|---|
| 7,023,866 B2 | 4/2006 | Giroux et al. |
| 7,085,846 B2 * | 8/2006 | Jenne et al. ............ 370/231 |
| 7,142,514 B2 | 11/2006 | Wang et al. |
| 7,151,790 B1 | 12/2006 | Patenaude et al. |
| 7,177,275 B2 | 2/2007 | Stanwood et al. |
| 7,453,804 B1 | 11/2008 | Feroz et al. |
| 7,474,668 B2 | 1/2009 | Bauman et al. |
| 7,633,869 B1 | 12/2009 | Morris et al. |
| 7,643,418 B1 | 1/2010 | Varier et al. |
| 2001/0033581 A1 * | 10/2001 | Kawarai et al. ............ 370/389 |
| 2002/0075805 A1 | 6/2002 | Gupta et al. |
| 2003/0056000 A1 * | 3/2003 | Mullendore et al. ......... 709/236 |
| 2003/0072317 A1 | 4/2003 | Yuang et al. |
| 2003/0103514 A1 | 6/2003 | Nam et al. |
| 2003/0126223 A1 * | 7/2003 | Jenne et al. ............ 709/212 |
| 2003/0128707 A1 | 7/2003 | Kalkunte et al. |
| 2003/0231593 A1 | 12/2003 | Bauman et al. |
| 2004/0218632 A1 | 11/2004 | Kang |
| 2005/0141424 A1 | 6/2005 | Lim et al. |
| 2006/0087974 A1 * | 4/2006 | Ozer et al. ............ 370/235 |
| 2006/0280119 A1 * | 12/2006 | Karamanolis et al. ........ 370/229 |
| 2006/0294044 A1 | 12/2006 | Karlsson et al. |
| 2007/0104208 A1 * | 5/2007 | Svensson ............ 370/412 |
| 2007/0118600 A1 | 5/2007 | Arora |
| 2007/0121504 A1 | 5/2007 | Hellenthal et al. |
| 2007/0165647 A1 * | 7/2007 | Kenney et al. ............ 370/412 |
| 2007/0189283 A1 | 8/2007 | Agarwal et al. |
| 2007/0223529 A1 | 9/2007 | Lee et al. |
| 2008/0056268 A1 * | 3/2008 | Washburn et al. ........... 370/394 |
| 2008/0080382 A1 * | 4/2008 | Dahshan et al. ............ 370/235 |
| 2009/0279558 A1 * | 11/2009 | Davis et al. ............ 370/412 |

OTHER PUBLICATIONS

Kung et al., "Receiver-Oriented Adaptive Buffer Allocation in Credit-Based Flow Control for ATM Networks," 1995, IEEE, vol. 1, pp. 239-252.

International Search Report and Written Opinion of the International Searching Authority issued in International Patent Application No. PCT/US08/87432 dated Feb. 9, 2009.

Entire Prosecution of U.S. Appl. No. 12/005,304 to Lee, et al., filed on Dec. 27, 2007, entitled "Dynamically Adjusted Credit Based Round Robin Scheduler."

* cited by examiner

Figure 1. Schedulers in IP routers

Figure 2. DRR scheduler with credit size of 500 bytes
(PRIOR ART)

Figure 3. DRR scheduler with small credit size of 1 byte
(PRIOR ART)

Figure 4. DRR scheduler with large credit weight size of 8,000 bytes (PRIOR ART)

Figure 5. Simulation Results
(for 3 queues, and average incoming packet size of 300)

Figure 6. DRR scheduler with dynamically adjusted credits

DYNAMICALLY ADJUSTED CREDIT BASED ROUND ROBIN SCHEDULER

RELATED APPLICATIONS

This application is a Continuation of U.S. application Ser. No. 12/005,304, filed on Dec. 27, 2007, now U.S. Pat. No. 8,045,563 the disclosure of which is incorporated by reference herein.

TECHNICAL FIELD

The present subject matter relates to a dynamically adjusted credit based round robin scheduler which dynamically adjusts credit depending upon a weighted moving average of incoming packet sizes.

BACKGROUND

In recent years, queuing schedulers have been widely used in networks to meet performance requirements of real-time applications, such as voice and video transmissions.

A. First-in First-Out (FIFO)

Historically, early communication routers used a First-in First-out (FIFO) queuing procedure at each output port. In FIFO, a single queue is maintained at each output port. When a new packet arrives, it is placed at the end of the queue. As long as the queue is not empty, the router transmits packets from the queue, taking the packet from the beginning of the queue (taking the "oldest" packet). Thus, FIFO provides a simple best-effort service to all applications using the Internet.

Despite the advantages of simplicity and robustness, FIFO may not be the optimum queuing procedure for real time applications, such as voice or video. It is often important to distinguish between communications that require real-time responses (such as voice, video, and other premium services), and communications that do not require real-time responses (such as email and file transfer which may only require a "best-effort" service). In other words, different communication services generally are not equally important, and therefore should be treated differently. The capability to provide service differentiations among application types and/or among users in a network is often referred to as quality of service (QoS).

FIFO has some serious drawbacks, especially in the field of communications. First, a "greedy source" that sends packets at extremely high-speed may crowd out other sources, and obtain more bandwidth than other sources. Second, if a number of shorter packets are behind very long packets, the FIFO scheme results in a longer average delay (per packet) than if the shorter packets were transmitted before the longer packet. Third, under the FIFO scheme, there is no means to give special treatment to high priority sources such as delay-sensitive voice or video packets.

In order to overcome these drawbacks, today's communication routers typically maintain multiple queues for each output port. If there are three classes of services (high, low, and medium), then voice and video packets may be placed in the high-class queue, and packets from the best-effort service can be placed in the medium or low class queue, depending on the importance of data.

When there are multiple queues and/or classes, a system designer must determine how to schedule packets among multiple queues. This has been an active area of research, and some effective scheduling algorithms have been proposed. Today, scheduling algorithms are not only widely used in routers/switches, but also various modems, WiFi access points (APs), base stations, PDSN, and many other networking equipment.

B. Simplest Scheduler: Round Robin Scheduler

The simplest scheduler is a round robin scheduler. A round robin scheduler maintains one queue for each class, and serves each queue in round-robin fashion, taking one packet (of any size) from each non-empty queue in turn. This round robin scheduler prevents a high-speed source from arbitrarily increasing its share of the bandwidth and causing the delay of other sources. In fact, under the round-robin scheme, when a source sends too many packets too fast, it merely increases the length of its own queue (assuming that a single source is constrained to a single queue). Even though the round robin scheme reduces the problem caused by high-speed sources producing many packets, the round robin scheduler does not consider packet size. Note that packet size is sometimes referred to as packet length.

In a round robin scheduler, a source sending long packets generally gets more bandwidth than a source sending short packets. In other words, the round-robin scheme is fair in terms of number of packets per queue, but might not be fair in terms of bandwidth per queue. Furthermore, a round-robin scheduler does not have a means to give more bandwidth to one queue over another queue.

C. Other Schedulers: WFQ, DRR, and WRR

The prior art includes numerous methods for allocating bandwidth among queues. Weighted fair queuing (WFQ), deficit round robin (DRR), and weighted round robin (WRR) are the most widely used methods for IP-based data network schedulers. Schedulers are used in many types of networking equipment, such as: modems, WiFi access points (APs), base stations, packet data serving nodes (PDSNs), routers/switches, etc.

DRR and WRR schedulers serve each queue in round-robin fashion, but a fixed amount of credit is given to each queue. Each queue is allowed to send up to the given credit in each turn. Therefore, fairness in terms of bandwidth among the queues may be obtained.

The credit-based approach is also able to give preference to one queue over the other queues, by assigning different amounts of credit to different queues. For example, if there are three queues, a scheduler may assign a different credit to each queue: a 900 byte credit for the first queue, a 450 byte credit for the second queue, and a 150 byte credit for the third queue (instead of 500 bytes each for all three queues). Packets are sent from each queue unless or until transmission would exceed the credit. Any unused credit may be carried over and added to the new credit for the next cycle. In this example, the bandwidth is effectively allocated (60%, 30% and 10%) among the three queues, thereby differentiating among the queues.

Thus, in credit-based schedulers such as DRR and WRR, a credit or weight is given to each queue in order to achieve a desired bandwidth allocation among the queues. The size of the credit or weight can have a significant impact on the performance of the scheduler, as will be discussed below in connection with the figures. Until now, however, no effective solution exists on how to adjust the size of the credits. Desired are simple and effective methods to dynamically adjust the size of credits for a credit based schedulers, so that the performance of the scheduler is improved.

SUMMARY

The teachings herein improve over conventional schedulers by dynamically adjusting the size of credits depending upon a moving average incoming packet size. Dynamically adjusting the size of credits depending upon a moving average incoming packet size alleviates the impact of traffic burstiness and packet size variation, and may increase the performance of the scheduler by lowering latency and jitter.

There are at least three distinct and not mutually exclusive variables: a) a moving average may be a simple moving average, or a weighted moving average; b) a moving average may be based upon incoming packet sizes for the entire scheduler, or incoming packet sizes for a single queue; and c) priority values (or bandwidth allocation values) for individual queues may be used to factor a moving average incoming packet size of the entire scheduler such that an average of all of the credits of the scheduler equals the moving average incoming packet size of the entire scheduler. Detailed discussion of these variables is provided in the detailed description section.

In a first non-limiting example, a round robin scheduler dynamically adjusts a first credit for a first queue and a second credit for a second queue based upon a moving average incoming packet size for the entire scheduler. The moving average incoming packet size may be a simple moving average or may be a weighted moving average, but the weighted moving average method is recommended. In this example, the first credit and the second credit must be equal in value.

In a second non-limiting example, a round robin scheduler dynamically adjusts a first credit for a first queue based at least partially upon a first product of a first priority value times the total sum of credits given to all queues, and dynamically adjusts a second credit for a second queue based at least partially upon a second product of a second priority value times the total sum of credits given to all queues, such that an average of all of the credits of the scheduler equals the moving average incoming packet size of the entire scheduler. For example, to determine the credit for each queue for the case of QoS, priority values must be multiplied by the total sum of credits given to all queues. Say, there are 3 queues, 500 is the average packet size, and priority levels are 60%, 30%, 10%. Then, each queue will have credits of 1500×0.6=900, 1500× 0.3=450, and 1500×0.1=150. That is, priority values are multiplied by the total credit (or average packet size times a number of active queues). The moving average incoming packet may be a simple moving average or a weighted moving average.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The term "credit" is used broadly throughout the specification and claims to include a quantity allocated to a queue as a round robin scheduler services the queue. The quantity may be measured in bits, or bytes, or kilobytes, or megabytes, or whatever units are convenient for measuring a size of a packet. Please note that conventional literature often uses the terms "weight" and "deficit" in place of the term "credit." For example, note the conventional term, "deficit round robins scheduler."

The term "weighted moving average" is used broadly throughout the specification and claims in conventional sense. This term will be illustrated mathematically below.

The term "priority value" is used broadly throughout the specification and claims to include a value used for allocating bandwidth among queues. This term will be illustrated mathematically below.

Additional discussion of these three terms (credit, weight, and priority value) is provided below. Thus, these three terms have distinct meanings in the claims.

Figure 1:
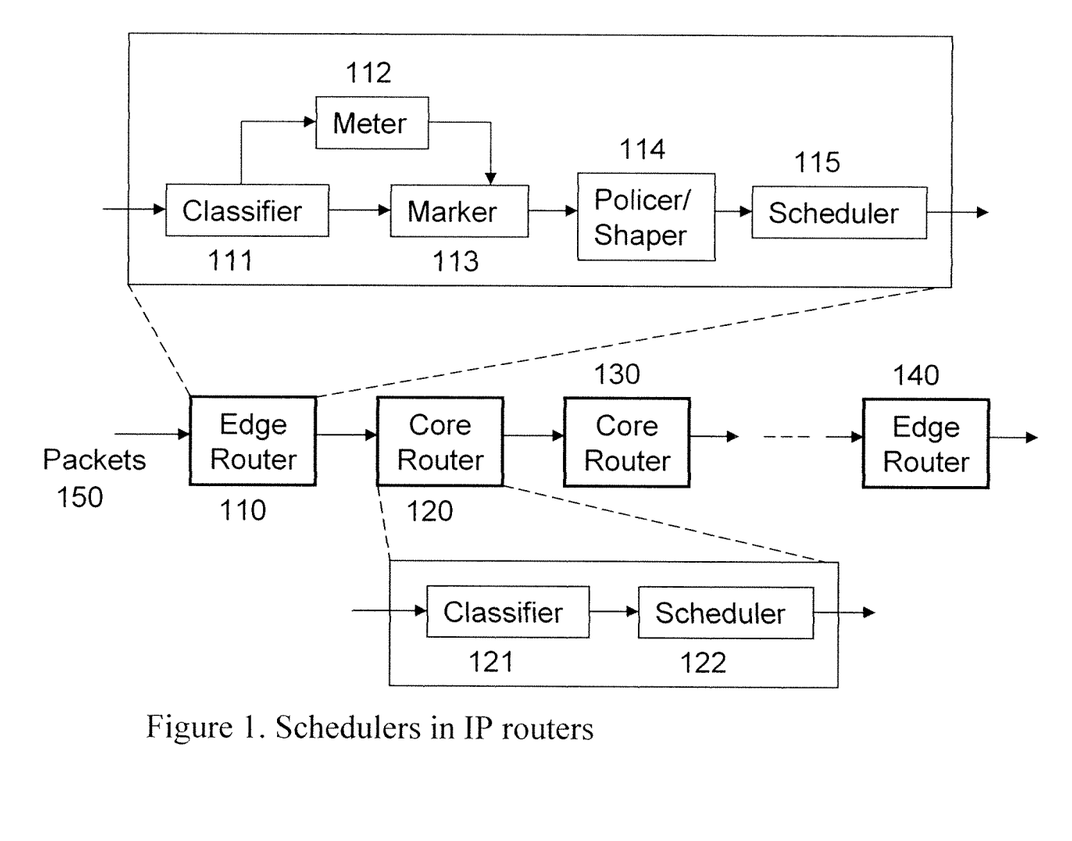
FIG. 1 is an exemplary IP network diagram illustrating a scheduler in an edge router and illustrating a scheduler in a core router, wherein at least one of the schedulers is a dynamically adjusted credit based round robin scheduler according to the present invention.

FIG. 1 is an exemplary IP network diagram illustrating a scheduler in an edge router and illustrating a scheduler in a core router, wherein at least one of the schedulers is a dynamically adjusted credit based round robin scheduler according to the present invention.

Specifically, the system of FIG. 1 comprises: edge router 110, core router 120, core router 130, and edge router 140. Edge router 110 receives packets 150, and comprises: classifier 111, meter 112, marker 113, policer/shaper 114, and scheduler 115. Core router 120 comprises classifier 111, and scheduler 122.

Each router may be configured to provide Quality of Service (QoS) or Differentiated Services (DiffServ) as specified by the network designer. The edge router 110 generally performs several important mechanisms for incoming packets to provide QoS, such as classification, marking, metering, policing/shaping, and scheduling. Thus, core router (or "interior" router) 120 may have minimal functionality and minimal overhead for providing differentiated services.

For example, edge router 110 may perform sophisticated classification based on multiple fields of header information listed below, but core router 120 may just look at the Differentiated Services Code Point (DSCP) values in the IP header to classify incoming packets.

Classifier 111 may separate incoming IP packets into different classes. This classification may be based on one or more fields in a packet:

IP flow identification: source IP address, destination IP address, IP protocol field, source port number, and destination port number IP precedence or DSCP (Differentiated Services Code Point) field TCP/IP header parameters such as packet length Source and destination Media Access Control (MAC) addresses Application identification based on port numbers, web URL (universal resource locator) addresses, etc.

Meter 112 may measure incoming traffic for conformance to a profile. The meter may determine whether a given packet stream conforms or exceeds the service level agreement.

Marker 113 may write/rewrite the DSCP field of IP packet's header to indicate which class this packet belongs to.

Policer/shaper 114 may delay traffic by buffering some packets so that they comply with the profile, and may drop all packets that do not comply with the traffic profile.

Scheduler 115 may be a round robin scheduler. When packets in edge router 110 are placed in queues based on DSCP values, scheduler 115 may decide which packets are transmitted first from which queue, thus determining end-to-end performance requirements. For real-time interactive applications, such as Voice-over-IP (VoIP), which require an end-to-end delay of not more than 150 msec to 350 msec for a natural interactive (two way) conversation, scheduler 115 is a critical component for controlling congestion.

Further, the techniques disclosed herein are not limited to communication system schedulers for internet protocol packets. For example, a shipping system may ship packages, and the packages may be scheduled by a scheduler. The size of incoming "packets" may be measured in weight or volume, or a combination of weight and volume. Also, the "queues" of a shipping system may be classes such as overnight delivery packages, standard delivery packages, and economy delivery packages. These queues (or classes) do not have to be physically separated into distinct physical queues in order for the scheduler to schedule them.

As another example, a manufacturing system may process containers of parts using a scheduler, and the size of incoming "packets" may be equivalent to the number of parts in the "packet." Broadly, a scheduler is any device that allocates a shared resource.

Figure 2:
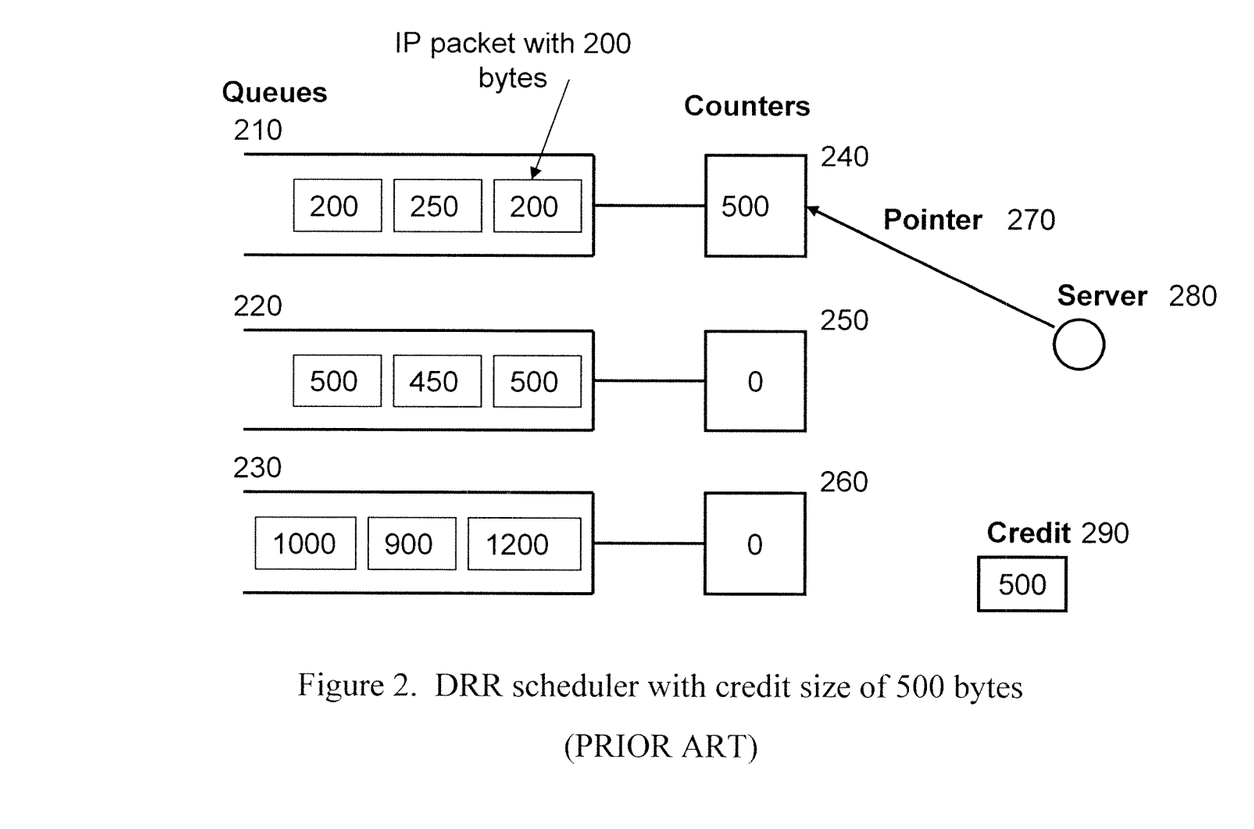
FIG. 2 is an exemplary conventional deficit round robin (DRR) scheduler with a credit size of 500.

FIG. 2 is an exemplary conventional deficit round robin (DRR) scheduler with an arbitrary credit size of 500 bytes. For example, a credit size of 500 bytes.

Specifically, FIG. 2 illustrates a deficit round robin (DRR) scheduler comprising: three queues (210, 220, and 230), three counters (240, 250, and 260), a pointer 270, a server 280, and a credit 290 with a size of 500 bytes. First queue 210 illustrates three IP packets with sizes of 200, 250, and 200. Each queue operates individually in a FIFO process, so the rightmost IP packet in queue 210 was the first in (oldest) and now is waiting to be the first out.

As discussed above, a DRR scheduler serves individual queues in a round robin fashion. When the pointer points to the first queue (as shown in FIG. 2), the credit size of 500 bytes is added to counter 240. Assume that the initial value in counter 240 was 0 bytes. (For simplicity, this DRR scheduler was initialized with 0 bytes in each counter.)

The first queue is allowed to send out packets totaling up to (but not exceeding) the credit size of 500 bytes which is presently stored in counter 240. Therefore, the first packet with the size of 200 is sent out, and the counter is reduced by the amount of the packet size. The counter value is now 300 bytes, which is 500 bytes minus 200 bytes. Since the counter value of 300 bytes exceeds the second packet size of 250 bytes, the second packet can also be sent out. Counter 240 is now 50 bytes, which is 300 bytes minus 250 bytes. However, the third packet is not allowed to be serviced at this time, since the packet size of 200 bytes exceeds the counter value of 50 bytes. Thus, the scheduler moves to the next queue.

Then the pointer points to the second queue 220 (if the second queue is non-empty). The credit of 500 bytes is added to counter 250. The first packet (oldest packet) in queue 220 can be sent out, and the counter 250 is reduced to 0 bytes, because 500 bytes minus 500 bytes is zero. Since there is no credit left in counter 250 of the second queue, the pointer will point to the third queue (if non-empty).

The third queue is not empty, so the credit of 500 bytes is added to counter 260. However, the first (oldest) packet in queue 260 cannot be sent, because the packet size of 1200 bytes exceeds the counter value of 500 bytes. Thus, this large packet of 1200 bytes has to wait for the next round to be served again.

Having finished one complete round serving every queue, the deficit round robin scheduler begins the second round with first queue 210. Now the pointer will point to the first queue again, if non-empty. The counter 240 is now 550 bytes (50 bytes left over from the first round, plus 500 bytes from the second round). The last packet in queue 210 with a size 200 bytes is serviced, and counter 240 is reduced to 350 bytes (550 bytes minus 200 bytes). And so on. Note that the first packet (oldest packet) in the third queue 230 will not be serviced until the third round, when counter 260 has accumulated 1500 bytes.

In general, for DRR scheduler, if there are no more packets in a queue after the queue has been serviced, the counter of that queue is reset to zero.

Note that the DRR scheduler achieves relative fairness in terms of bandwidth by allocating a fixed credit to each queue. Therefore, a greedy source sending packets at extremely high-speed cannot consume more bandwidth than others. The greedy source will just congest its own dedicated queue, and packets of the fast source may be dropped if the size of the queue is exceeded. Furthermore, the DRR scheduler punishes a greedy source which sends large packets. The large packet (1200 bytes) in the third queue has to wait until the counter reaches the a value equal to or exceeding the packet size of 1200 bytes, while small packets in the first queue are being serviced right away. For example, the large packet in the third queue with a packet size of 1200 bytes was not processed in the first round due to its large size, and had to wait until the third round for its counter to accumulate 1500 bytes.

In the example of FIG. 2, the credit size is arbitrarily assumed to be 500 bytes, but it is not clear how to optimally determine the size of the credit. Conventionally, network managers and administrators usually arbitrarily set the credit size by guessing. However, this arbitrary assignment of credit size can have a significant negative impact on the performance of scheduling algorithms under certain conditions. To illustrate this negative impact, let us consider an example where the credit size is set very small, such as 1 byte, as shown in the next figure.

Figure 3:
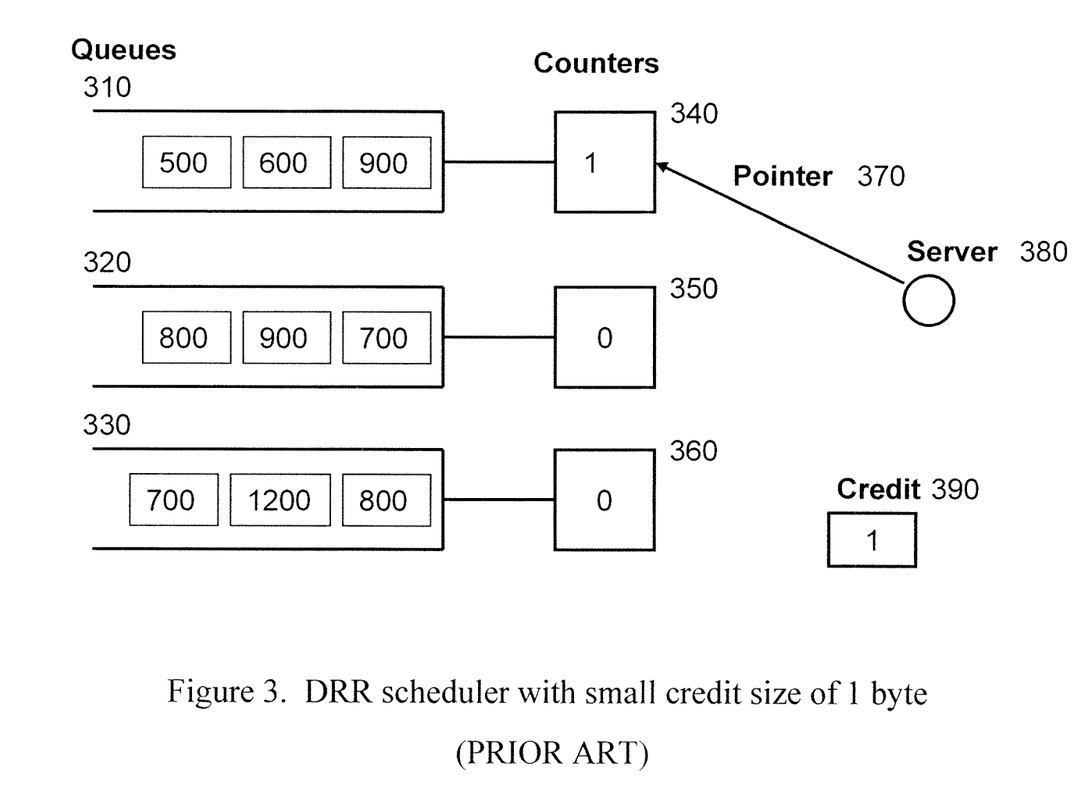
FIG. 3 is an exemplary conventional deficit round robin (DRR) scheduler with a credit size of 1.

FIG. 3 is an exemplary conventional deficit round robin (DRR) scheduler with a small credit size of 1 byte.

Specifically, FIG. 3 illustrates a DRR scheduler with three queues (310, 320, and 330), three counters (340, 350, and 360), a pointer 370, a server 380, and a credit 390 with a value of 1 byte.

In the first round, the DRR adds a credit of 1 byte to counter 340 (which initially had a value of 0). Since the first (oldest) packet in queue 310 has a packet size of 900 bytes, and 900 bytes exceeds the counter value of one byte, then the packet cannot be serviced. Skipping to the second round, counter 340 will be incremented again by 1. The counter value is now 2, but the packet still cannot be serviced. And so on. Therefore, the first packet in the first queue has to wait 900 rounds to be serviced. During these 900 rounds, if the other queues are non-empty (or busy) and the packet size of the first packets in the other queues are smaller than 900 bytes, then the packets in the other queues will be serviced before the first packet in the first queue can be serviced. In this example, the first packet in the second queue with a size of 700 bytes and the first packet in the third queue with a size of 800 bytes would both be serviced (totaling 700 bytes plus 800 bytes equals 1500 bytes) before the first packet in the first queue is serviced.

Further, the 900 rounds may consume substantial resources in terms of computing power and time. Note that checking a single queue during a single round may require: a) setting the pointer to a target counter of a target queue, b) determining that the target queue is not empty, c) adding the credit size to the value stored in the target counter, d) determining that the size of the first packet in the target queue exceeds the value in the target counter. In other words, this scheduler performs a great deal of "overhead" work for a long time before it sends a single packet.

Thus, if the first queue was a high priority class for real-time applications such as voice and video, then arbitrarily selecting a very small credit size would have significant negative impact on the performance of the scheduler, and would cause unnecessary delay and jitter. On the other hand, arbitrarily selecting a very large credit size will also have a negative impact, as shown in the next figure.

Figure 4:
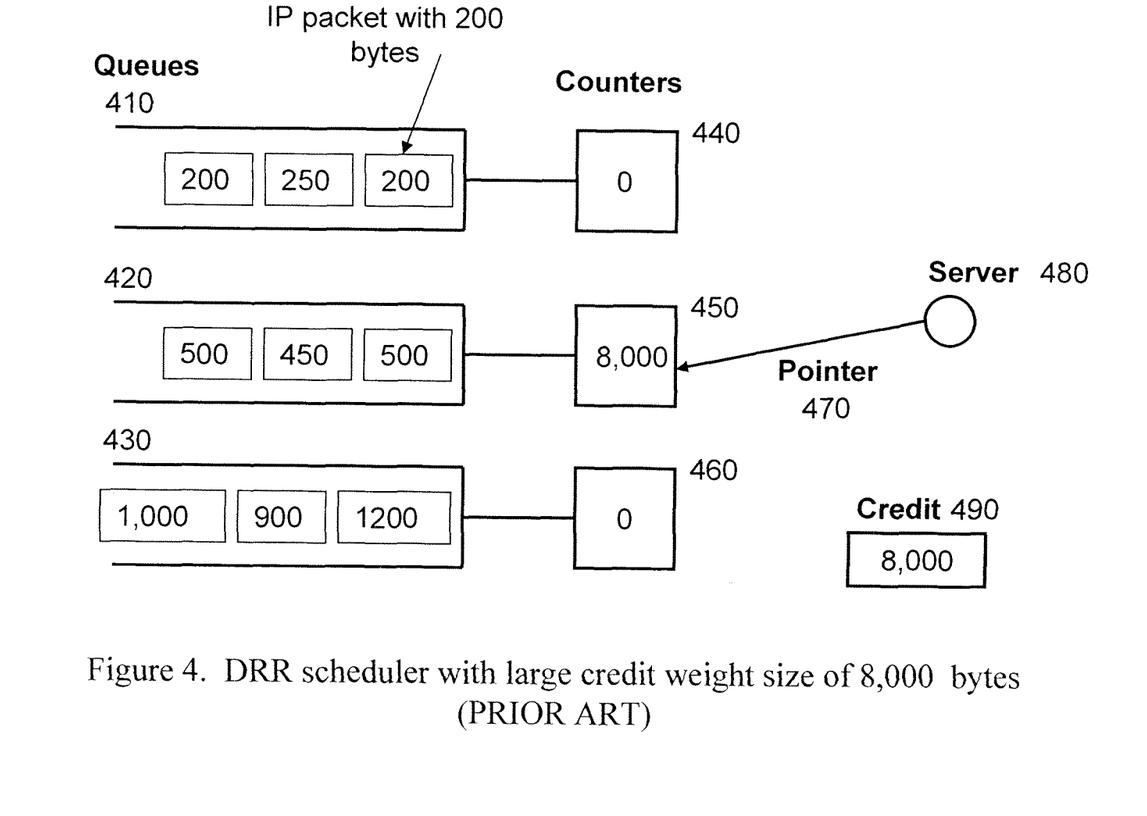
FIG. 4 is an exemplary conventional deficit round robin (DRR) scheduler with a credit size of 8,000.

FIG. 4 is an exemplary conventional deficit round robin (DRR) scheduler with a large credit size of 8,000 bytes.

Specifically, FIG. 4 illustrates a DRR scheduler with 3 queues (410, 420, and 430), three counters (440, 450, and 460), a pointer 470 which is pointing to the second queue (queue 420), a server 480, and a credit 490 with a value of 8,000 bytes.

In this example, if queue 420 is currently holding packets totaling at least 8,000 bytes, and if queue 430 is currently holding packets totaling at least 8,000 bytes, then the scheduler will process up to 8,000 bytes from queue 420 and up to 8,000 bytes from queue form queue 430 (totaling up to 16,000 bytes) before servicing a single packet from queue 410. This scheduler provides an undesirable wait for the small packet of 200 bytes waiting at the front of the line in queue 410.

These examples illustrate that the size of the credit is an important factor in the performance of DRR schedulers.

Figure 5:
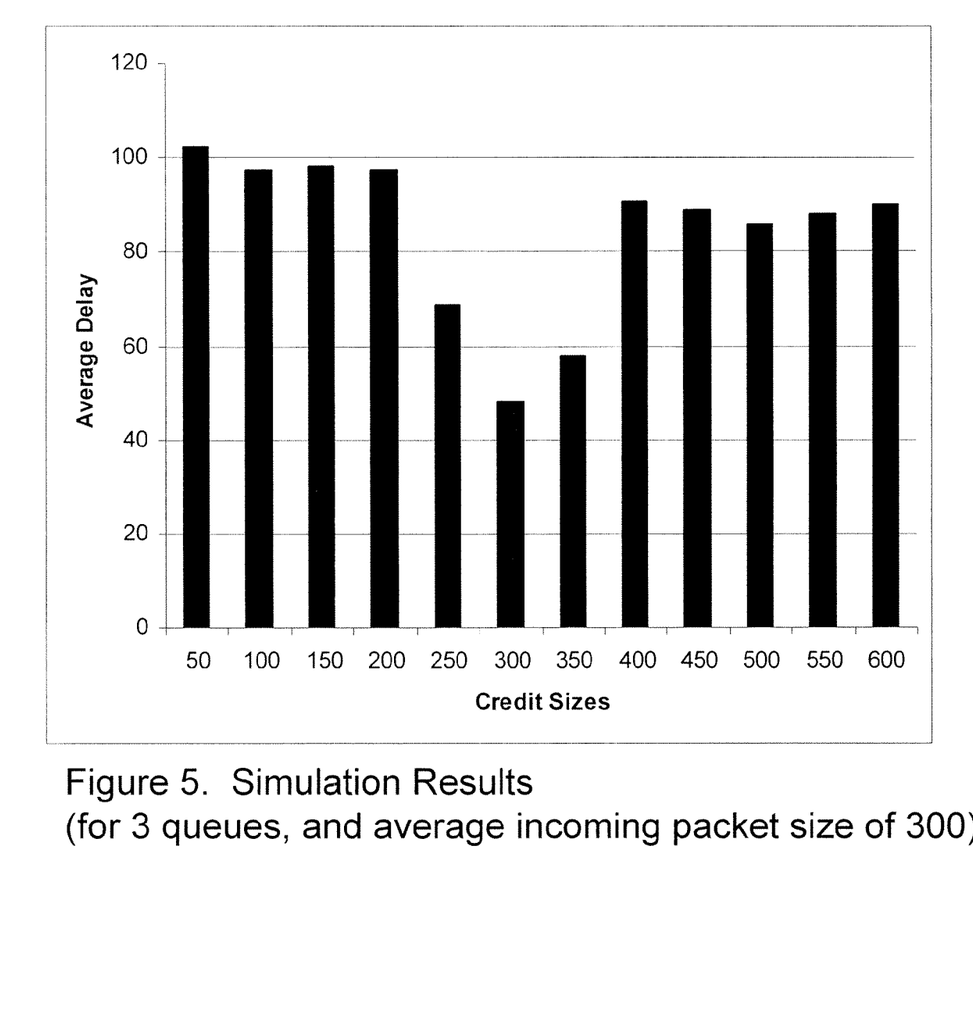
FIG. 5 illustrates simulation results for a deficit round robin (DRR), wherein the average delay is measured as a function of credit size, for traffic with an average packet size of 300.

FIG. 5 illustrates simulation results for a deficit round robin (DRR) scheduler, wherein the average delay is measured as a function of credit size. The simulation results are for incoming traffic with an average packet size of 300.

Specifically, in order to determine an optimum credit size in a DRR scheduler, a simulation was designed with the following parameters: incoming traffic randomly ranged in size between 100 and 500; incoming traffic had a mean packet size of 300; and three queues. The credit size was varied from 50 to 500 in increments of 50, and an average delay for packets in a target queue was determined for each credit size.

Thus, the horizontal axis illustrates credit size, and the vertical axis illustrates an average delay for packets in the simulation performed at a fixed credit size. For example, if the simulation system was performed at a credit size of 300 (equal to the average packet size of the incoming traffic), then the average delay for packets in the target queue was about 50.

Thus, average delay is minimized (and performance is maximized) when the credit size of a DRR is approximately equal to the average packet size of the incoming traffic. Note that credit sizes of 250 and 350 yield low average delays of about 70 and 60 respectively. Thus, credit sizes within about 20% of the average packet size substantially reduced the average delay of the system.

Thus, schedulers used in modems, base stations, APs, PDSN, SGSN, and routers/switches should be operated with a credit size approximately equal to the average packet size of incoming traffic in order to improve the performance of real-time applications such as voice and video.

Figure 6:
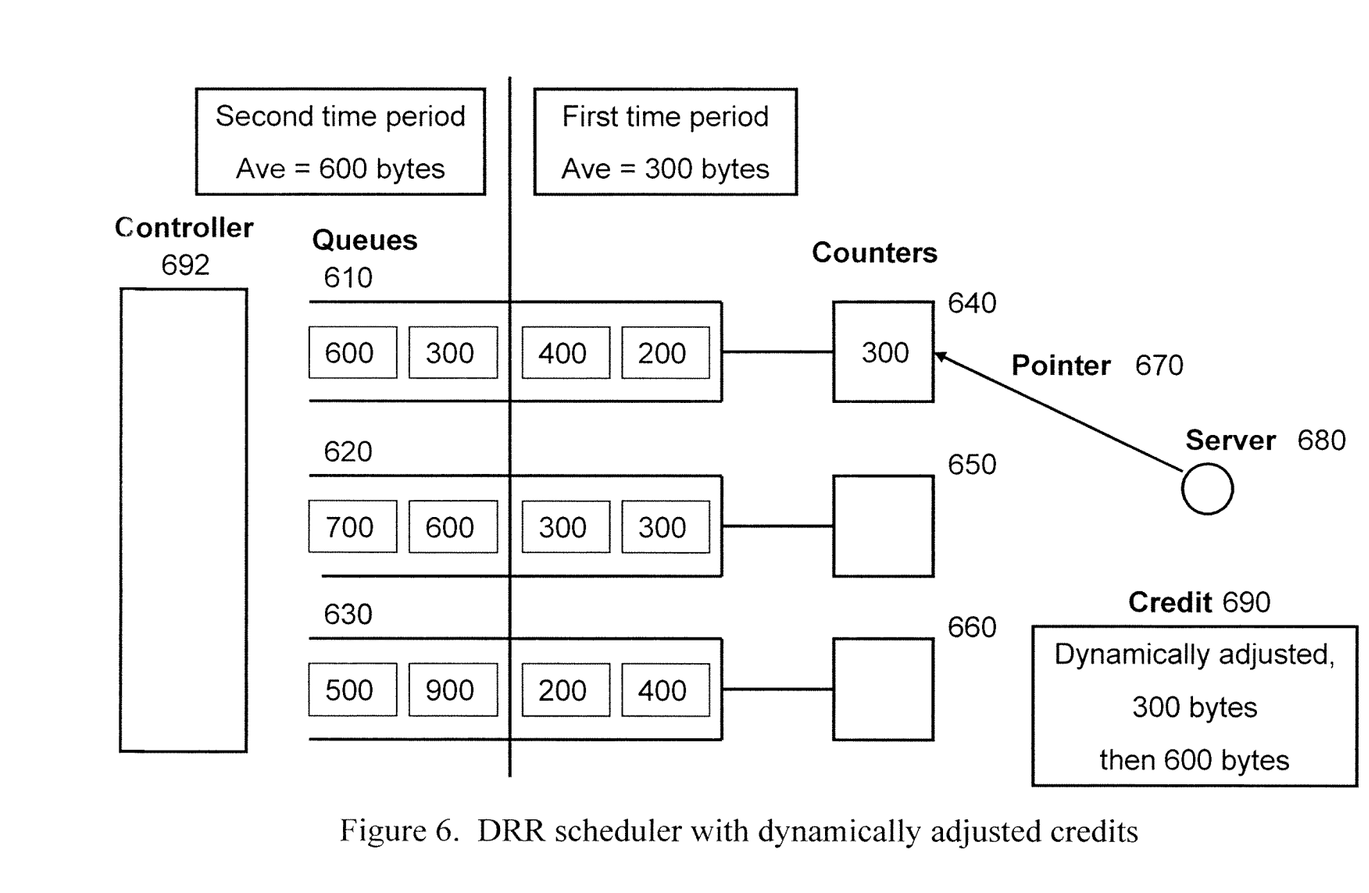
FIG. 6 illustrates a DRR scheduler with dynamically adjusted credits.

FIG. 6 illustrates a DRR scheduler with dynamically adjusted credits.

Specifically, FIG. 6 illustrates a DRR scheduler with three queues (610, 620, and 630), and three counters (640, 650, and 660), a pointer 670, a server 680, a dynamically adjusted credit 690, and a controller 692.

The controller 692 monitors the sizes of incoming packets during various time periods, and dynamically adjusts the credit on the basis of the average size of incoming packets during a specific time period. For example, during a first time period packets of: 200 bytes and 400 bytes are received by the first queue (queue 610); 300 bytes and 300 bytes are received by the second queue (queue 620); and 400 bytes and 200 bytes are received by the third queue (queue 630). These packets are illustrated on the right hand side of the vertical line intersecting the queues. Thus, during the first time period, the average incoming packet size is 300 bytes. Therefore, the credit is dynamically adjusted to 300 bytes, and 300 bytes are added to each counter during a first operation period. Note that the first operation period is not equivalent to the first time period. The first operation period must occur after the first time period is complete, so that the average incoming packet size during the first time period is known. Thus, for example, the first operation period may begin immediately after the first time period is completed, and the first operation period may be equal in length to the first time period, or the first operation period should continue until the second time period is complete.

Further, during a second time period packets of: 300 bytes and 600 bytes are received by the first queue (queue 610); 600 bytes and 700 bytes are received by the second queue (queue 620); and 900 bytes and 500 bytes are received by the third queue (queue 630). These packets are illustrated on the left hand side of the vertical line intersecting the queues. Thus, during the second time period the average incoming packet size is 600 bytes. Therefore, the credit is dynamically adjusted to 600 bytes, and 600 bytes are added to each counter during a second operation period. Note that different numbers of packets may be received by different queues during any given time period. The second operation period must occur after the second time period is complete. Thus, for example, the second operation period may begin immediately after the second time period is complete.

The example of FIG. 6 is a simple example. During ordinary operations the time periods used for measuring packet sizes may be long enough to accept large number of packets to compute statistically significant average packet sizes. The exact implementation details on how to synchronize between the time periods and operation periods should be decided by vendors or service providers to achieve the desired level of performance improvements and implementation complexity. In our example, the time periods are fixed, and the operation period is assumed to be equal to the time period in duration.

Dynamic Size Adjustment Algorithms

The optimum credit size may change over time as the characteristics of the incoming packets change over time, as data traffic tends to be bursty in nature and IP packet sizes vary from packet to packet. To smooth out any abrupt temporary fluctuations, a moving average may be used, wherein a moving average is calculated over multiple period.

Additionally, queues may be prioritized, such that one queue may receive a larger credit than another queue.

An exemplary algorithm for determining a credit size is formally stated below using a weighted moving average and prioritizing the queues. After the formal statement, detailed description of the proposed algorithm follows. For this algorithm, the following notations are used.

Variables of Algorithm

T: time interval for each time period of the weighted moving average (e.g. 1 second)

$s_k$: average packet size of packets received during period k (e.g. 300 bytes)

$n_k$: number of packets received during period k (e.g. 5 packets)

$s_{kj}$: size of packet j received during period k $\bar{s}_k$: weighted moving average at period k $\beta$: average moving weight constant q: number of queues $\alpha_i$: priority value for each queue, i=1, 2, ..., q $c_i$: credit given to each queue Steps of Algorithm Step 1. Initialization.
  i. Set the time window size, T.
  ii. Set the average moving weight constant, $\beta$.
  iii. Set the priority value for each queue, $\alpha_i$, i=1, 2, ..., q. For $\alpha_i \in R$, $\alpha_i \in [0,1]$, $$\sum_{i=1}^{q} \alpha_i = 1$$

Step 2. Compute average packet sizes for each period k.

$$s_k = \frac{\sum_{j=1}^{n_k} s_{kj}}{n_k} \quad (1)$$

where $n_k$ is the number of packets in each time period.

Step 4. For period k, compute the weighted moving average as follows.

$$\bar{s}_k = \beta \cdot s_k + (1-\beta) \cdot \bar{s}_{k-1} \quad (2)$$

Step 5. If no differentiated service is required (in other words, treating all queues equally), set the average credit for all queues.

$$c = \lceil \bar{s}_k \rceil \quad (3)$$

where $\lceil \ \rceil$ is the ceiling function that returns the smallest integer greater than or equal to x. This is the weight for the scheduling algorithm.

Else, assign priority value, $\alpha_i$, to each queue, i=1, 2 ..., q. The credit for each queue in the scheduling algorithm is set as follows.

$$c_i = \lceil \alpha_i \cdot q \cdot \bar{s}_{k+1} \rceil, i=1,2,\ldots,q \quad (4)$$

Step 6. Go to Step 2 and proceed as before. For the next period, k+1, compute $s_{k+1}$ and $\bar{s}_{k+1}$ using the formula (1) and (2), respectively.

In order to facilitate understanding how the algorithm works, the algorithm is now described in greater detail.

In step 1, all the necessary parameters for the algorithm are set. In particular, we set the time window size as T. This is the duration of time for each period that will be used to compute the average packet size. The average moving average constant, $\beta$, should also be set. In order to obtain the best estimate of average packet size, a small weight is recommended for the most recent observation, so that temporary fluctuations do not invalidate the estimate. Finally, if differentiated services among queues are required, priority values among queues must be set. For example, if there are three queues (high, medium, and low services), then $\alpha_1=0.6$ (60%), $\alpha_2=0.3$ (30%), and $\alpha_3=0.1$ (10%) The percentages represent a percentage of the bandwidth which is allocated to each queue. Of course, these values are merely examples.

In step 2, the average packet size, $s_k$, is computed by adding packet sizes of all incoming packets and then divided by the number packets for a period k.

In step 3, since data traffic tends to be bursty, the average packet size in any one period also tends to fluctuate, resulting in incorrect set-up of weight sizes. To smooth out the impact of traffic burstiness, the algorithm takes a weighted moving average of the average packet size for each period. In general, smaller $\beta$ implies putting more significance on the older average values, and larger $\beta$ implies putting more significance on the most recent average value. A small weight is recommended so that temporary fluctuations do not invalidate the estimate.

If no differentiation of services is required, we set the credit size as $c=\lceil \bar{s}_k \rceil$, for all queues (or classes), where $\lceil x \rceil$ means the smallest integer which is greater than or equal to x. Now suppose that differentiated services are required. If there are three classes (i.e., q=3) and three priority values are given such that $\alpha_1=0.6$, $\alpha_2=0.3$, and $\alpha_3=0.1$, the priority values for three queues would be $c_1=(0.6)(3)\bar{s}_{k+1}$, $c_2=(0.3)(3)\bar{s}_{k+1}$, and $c_3=(0.1)(3)\bar{s}_{k+1}$. This exemplary scheduler distributes its total bandwidth among three queues by giving 60% to the first queue, 30% to the second queue, and 10% to the third queue. For example, the first queue may be dedicated to real-time applications such as voice and video. The second queue may be for high premium data services or streaming video, and the third queue for best effort data services. In general, if there are q number of queues and $\alpha_i$'s are their corresponding priority values, then the credit for each queue may be determined by the following equation: $c_i=\lceil \alpha_i q \bar{s}_{k+1} \rceil$, i=1, 2, ..., q. This is shown in step 4.

In step 5, we need to compute $s_{k+1}$ in order to determine the next period credit size. We go to step 2 and compute $s_{k+1}$. And proceed as before. As discussed regarding the simulation results of FIG. 5, peak system performance is obtained when the system operates between approximately 80% and 120% of the average packet size, for the simulation system of FIG. 5. Thus, the above equations may be altered or optimized based on simulation or experimental results by +/−20%. For example, a differentiated size may be $c_i=\lceil 1.2\alpha_i q \bar{s}_{k+1} \rceil$, or $c_i=\lceil 0.8\alpha_i q \bar{s}_{k+1} \rceil$. Similarly, the floor function (truncating if necessary to get an integer) may be used in place of the ceiling function. Similarly, the ceiling function may be omitted entirely, and the differentiated size may be non-integer. These type of variations fall within the scope of the invention.

Advantages

The proposed algorithm may be implemented as part of credit-based scheduling algorithms like DRR/WRR, which are used in many networking equipment in both wireline and wireless networks. It may be implemented in software or hardware. The proposed algorithm offers several advantages when implemented with a DRR scheduler:

As illustrated by discussion and by simulation, either too small or too large credit sizes cause unnecessary delay and therefore poor performance for the scheduler. By computing the average packet size of incoming traffic and setting the credit size equal to approximately the average packet size, the average delay time is minimized and jitter is reduced for real-time applications.

Due to the bursty nature of data traffic, the average packet size in any one period may fluctuate. Therefore, the algorithm takes a weighted moving average over multiple periods. This will smooth out any transitional peaks and valleys in determining credit sizes.

The algorithm utilizes the sliding window technique. Therefore, for the next period computation, previous p−1 values are fed back into the computation and only the computation of current period is required. This results in the minimum algorithm complexity of order 1, or O(1).

The algorithm is dynamic in nature. It constantly updates the credit sizes every T seconds. Therefore, the credit size adapts quickly as traffic condition changes. As a result, average delays should be reduced in comparison which a scheduler that does not dynamically adjust to oncoming traffic patterns.

There are no disadvantages to adopting this proposed algorithm. The integration of the proposed algorithm into existing credit-based scheduling algorithms does not incur additional algorithm complexity. DRR schedulers have an algorithm complexity of order 1, O(1). The proposed additional algorithm described above does not increase the order of complexity.

WFQ (Weighted Fair Queuing) scheduling algorithms have some performance advantages over credit based algorithms. However, WFQ scheduling algorithms have a high algorithm complexity of order q, O(q).

The proposed algorithm is so efficient in computation that its complexity is O(1), in contrast to O(q) for WFQ scheduling algorithms. Therefore, when the proposed algorithm is integrated into credit-based scheduling algorithms, the overall algorithm complexity remains O(1).

In the simple example provided in FIG. 6, the time periods were conveniently selected so that all packets clearly fell into the first time period or clearly fell into the second time period. In a real system, the first time period will often end while an unfortunate packet is still being received by the scheduler. This unfortunate packet is unfortunate because it is received during two or more time periods. One simple accounting solution is to exclude this unfortunate packet from the set of packets received during the first time period (and forcing this unfortunate packet to be defined received during some later time period, such as during the time period in which the unfortunate packet completes reception). This solution has the advantage of promptly closing the set of packets received during the first time period, and promptly allowing calculations based on the sizes of packets received during the first time period. In this fashion, packets may be defined as belonging to the time period during which they finish being received by the scheduler. Alternatively, packets may be defined as belonging to the time period during which they begin to be received by the scheduler. Yet another possibility is to simply ignore packets which are unfortunate due to being received during two or more time periods. These and other related accounting procedures will be apparent to a person of skill in the art, and are contemplated by this application. Credit size for the scheduler during this first time period may be set to some predetermined default size, because no averages have been determined yet. This first time period may be defined as an initializing or default operation period for the scheduler.

In the simplest case, a first operation period (perhaps of identical size as the first time period) for processing packets would begin immediately after the first time period ended, and the first operation period would use a credit size based on a simple moving average packet size of packets which finished being received during the first time period. However (similar to the above discussion for receiving packets), in a real system the first operation period will generally end while another unfortunate packet (perhaps in the second queue) is being transmitted. Note that this unfortunate packet is unfortunate because it is transmitted during two or more operation periods. A first possibility is to allow this unfortunate packet to complete transmission, moving to the next queue, and then using a credit size equal to the moving average of the first time period. A second possibility is to continue operating the scheduler using the predetermined default size until the last queue has been serviced, thus completing a "round robin" of all the queues. A third possibility is to continue operating the scheduler using the predetermined default size until all of the packets which were received during the first period have been serviced. These and other related accounting procedures will be apparent to a person of skill in the art, and are contemplated by this application.

Additionally, the first operation period may begin a predetermined length of time after the first period, in order to allow for calculations based on packets received during the first period to be completed.

The above transitional accounting possibilities are illustrative and non-limiting. A person of skill in the art would understand that other accounting possibilities exist for transitioning between time periods for measuring packet size, and also for transitioning between operation periods for operating at a specific credit size. These periods may vary in length, and a time period may not precisely match any specific operation period.

As discussed above, it is preferred to use moving averages based upon all packets received by the scheduler. Using a moving average of packets received by an individual queue is not preferred. Also, using a moving average of packets received by a group of individual queues which does not include all queues is not preferred.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A routing method, comprising steps of:
   receiving incoming Internet Protocol (IP) packets at a router;
   placing a first plurality of the received IP packets intended for an output port of the router in a first queue of a round robin scheduler of the router;
   placing a second plurality of the received IP packets intended for the output port of the router in a second queue of the round robin scheduler of the router;
   computing a moving average over time for incoming packet size, from sizes of the IP packets received at the router, the moving average being computed from an average of both the first plurality of IP packets and the second plurality of IP packets over a predetermined period of time;

weighting the moving average based on a previous moving average from a previous period of time;

dynamically determining a first credit of the round robin scheduler for the first queue and a second credit of the round robin scheduler for the second queue based on the weighted moving average;

determining priorities of the first queue and the second queue;

comparing the priorities of the first queue and the second queue to each other;

wherein:

the first credit and the second credit are set as the weighted moving average when the comparison indicates that the priorities of the first queue and the second queue are the same, and the first credit and the second credit are computed by multiplying the weighted moving average of the IP packets received at the router by a first percentage weight and a second percentage weight respectively when the comparison indicates that the priorities of the first queue and the second queue are different, the first percentage weight being different than the second percentage weight; and operating the round robin scheduler to take IP packets form the first and second queues in a round robin fashion, for transmission from the router via the output port, in respective amounts based on the dynamically determined first credit and second credit.

2. The method of claim 1, wherein the moving average over time for incoming packet size is defined as a simple moving average of sizes of all packets incoming into all queues of the round robin scheduler over a recent period of time.

3. The method of claim 2, wherein the first credit equals the simple moving average, and the second credit equals the simple moving average.

4. The method of claim 1, wherein a ceiling function is applied to the moving average over time such that the moving average over time is set to a smallest integer greater than or equal to the moving average over time.

5. The method of claim 1, wherein priority values are set for the first queue and the second queue, and a percentage of bandwidth is applied to the first queue and the second queue according to the respective set priority values.

6. A router comprising:

input and output ports; and a dynamically adjustable round robin scheduler comprising queues and a controller, wherein the scheduler is configured to:

(a) place a first plurality of incoming Internet Protocol (IP) packets received by the router intended for an output port of the router in a first one of the queues of the round robin scheduler;

(b) place a second plurality of the incoming IP packets received by the router intended for the output port of the router in a second one of the queues of the round robin scheduler;

(c) compute a moving average over time for incoming packet size, from sizes of the IP packets received at the router, the moving average being computed from an average of both the first plurality of IP packets and the second plurality of IP packets over a predetermined period of time;

(d) weight the moving average based on a previous moving average from a previous period of time;

(e) dynamically determine a first credit of the round robin scheduler for the first queue and a second credit of the round robin scheduler for the second queue based on the weighted moving average;

(f) determining priorities of the first queue and the second queue;

(g) comparing the priorities of the first queue and the second queue to each other;

wherein:

the first credit and the second credit are set as the weighted moving average when the comparison indicates that the priorities of the first queue and the second queue are the same, and the first credit and the second credit are computed by multiplying the weighted moving average of the IP packets received at the router by a first percentage weight and a second percentage weight respectively when the comparison indicates that the priorities of the first queue and the second queue are different, the first percentage weight being different than the second percentage weight; and (h) operate the round robin scheduler to take IP packets from the first and second queues in a round robin fashion, for transmission from the router via the output port, in respective amounts based on the dynamically determined credits.

7. The router of claim 6, wherein a ceiling function is applied to the moving average over time such that the moving average over time is set to a smallest integer greater than or equal to the moving average over time.

8. The router of claim 6, wherein priority values are set for the first queue and the second queue, and a percentage of bandwidth is applied to the first queue and the second queue according to the respective set priority values.

* * * * *